(No Model.)
C. A. IVES.
BICYCLE OR OTHER TRACTION WHEEL.
No. 516,054. Patented Mar. 6, 1894.
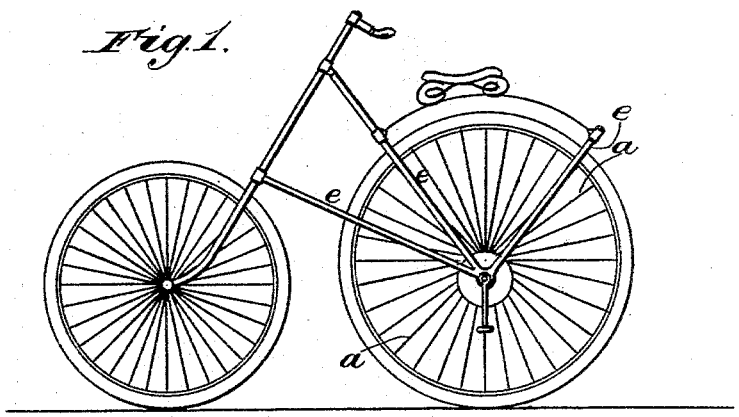
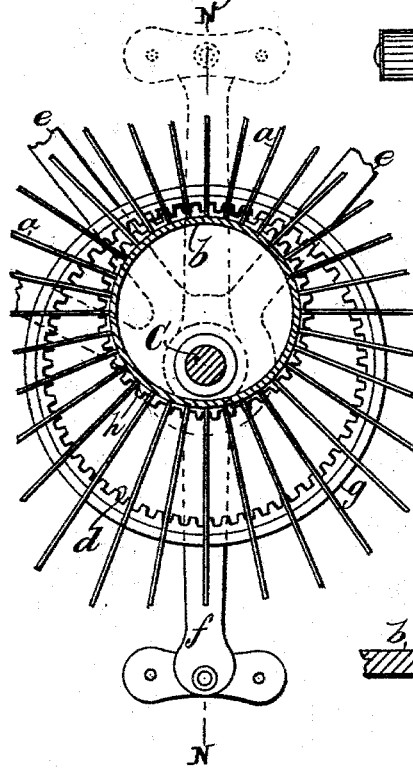
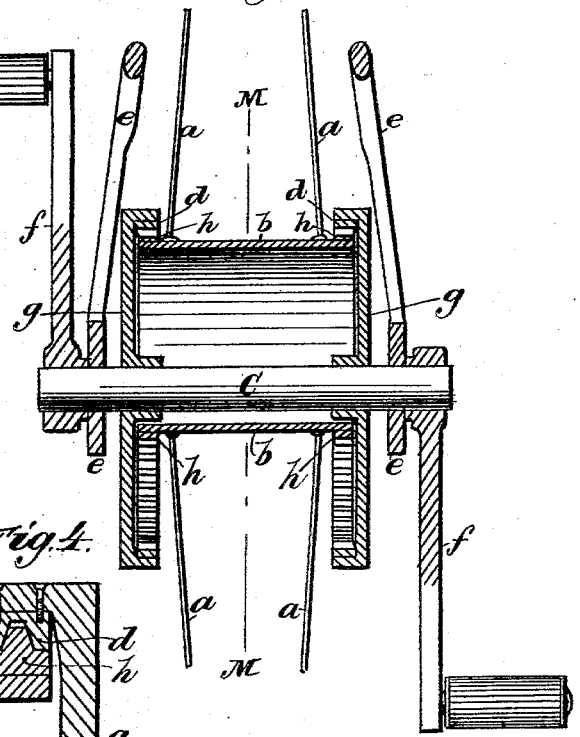
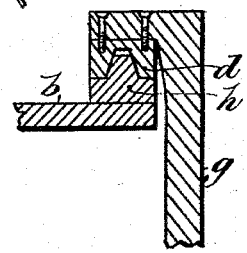
Witnesses.
Inventor:
Charles Acton Ives.
By James L. Norris.
Atty.

UNITED STATES PATENT OFFICE.

CHARLES ACTON IVES, OF NEWPORT, RHODE ISLAND.

BICYCLE OR OTHER TRACTION WHEEL.

SPECIFICATION forming part of Letters Patent No. 516,054, dated March 6, 1894.

Application filed October 18, 1893. Serial No. 488,533. (No model.)

*To all whom it may concern:*

Be it known that I, CHARLES ACTON IVES, a citizen of the United States, residing at Newport, in the county of Newport and State of Rhode Island, have invented new and useful Improvements in Bicycle or other Traction Wheels, of which the following is a specification.

This invention relates to that type of vehicles, particularly bicycles, wherein a driveshaft or axle extends eccentrically through a hollow hub having teeth or pinions near its ends which engage internal gears mounted on the drive-shaft or axle in such manner that when the drive-shaft or axle is rotated the internal gears rapidly rotate the hub.

In prior driving mechanism of the character alluded to the drive-shaft is journaled in bearings on the main frame, and the ends of the hollow hub are supported by and turned within ring bearings forming parts of such main frame, in consequence of which the friction is so excessive as to render the construction objectionable instead of advantageous.

The objects of my invention are to dispense with all bearings for the hollow hub; to materially reduce the friction; to throw the weight of the main frame and rider or load solely upon the drive-shaft and indirectly upon the upper portions of the two opposite ends of a hollow hub; to materially simplify and economize the construction; and to provide a desirable elasticity of motion in traveling over rough roads.

To accomplish these objects my invention consists in the features of construction and the combination or arrangement of devices hereinafter described and claimed.

I have illustrated and described my invention in connection with the wheel of a bicycle or other vehicle of the velocipede type, wherein the drive-shaft or axle is operated by pedal-carrying cranks, but I wish it clearly understood that the invention may be used in connection with the traction wheels of any vehicle, such as a locomotive or traction engine.

The invention is illustrated by the accompanying drawings, in which—

Figure 1 is a side elevation, showing my invention applied to a bicycle. Fig. 2 is a detail sectional view taken on the line N—N, Fig. 3. Fig. 3 is a sectional view taken on the line M—M, Fig. 2; and Fig. 4 is a detail sectional view of a modification hereinafter explained.

In said drawings the outer wheel $a$ represents the driving wheel of the bicycle; $b$ represents a hollow hub composed of a cylinder which is made of a single piece of thin metal sufficiently strong and rigid to have attached to it and to firmly hold the metallic or other kind of spokes of said wheel. Said hollow hub $b$ may be of any size, provided only it be sufficiently large inside to permit the insertion through it from end to end near its lower inner surface and below its central line of the axle $c$. This axle, $c$, is enough longer than the hollow hub $b$ to carry outside of each end of said hub, $b$, the internal gear or friction wheels $d$, $d$, the frame of the bicycle, $e$, $e$, said frame supporting the rider, and the cranks, crankpins and pedals, $f$, $f$, $f$, as indicated in the said drawings. The axle $c$ has the internal gear or friction wheels $d$, $d$, firmly attached to it by means of spokes or plates $g$, $g$, so that as the axle $c$ is revolved, these wheels $d$, $d$, will turn with it. The gear or friction wheels $d$, $d$, are not attached to the spokes or plates $g$, $g$, in the line of their direction, but are attached to the inner edges of said spokes or plates by means of the flanges, $i$, $i$, so as to overhang the outer ends of the hub $b$. The wheels $d$, $d$, are proportionally larger than the rings $h$, $h$, hereinafter mentioned, as the axle $c$ is farther below the center of the hollow hub $b$. The spokes of the bicycle-wheel $a$ are fastened to the hub $b$ sufficiently far from its outer ends to allow the attachment to and around each outer end of the rings $h$, $h$, which may be cogged or otherwise fitted to engage the geared or frictional perimeters, as may be desired, of the outer gear or friction wheels $d$, $d$. If desired these rings $h$, $h$, with their cogged, geared, or frictional perimeters, may be made in one piece with the hub $b$; but it is intended, and it is only important, first that the rings $h$, $h$, shall be of equal size as to their diameters, as nearly as may be, and the outer rings, or wheels $d$, $d$, of equal size as to their diameters, as nearly as may be; and, second, that whether gearing or frictional bearing surfaces be used, the inner and outer gearing or frictional surfaces be so made as to accurately engage one another with as little drag or slip as may be, the aim being to drive the hub $b$, and with it the driving wheel $a$ by the revolution of the axle $c$, and its connected internally geared or frictional wheels $d, d$, working upon the rings $h, h$. The axle $c$ is held in place by its contact with and bearing upon the upper surfaces of the rings $h, h$, as above described, and by the frame of the bicycle or other machine on which is the weight of the rider, or other load, as the case may be. The usual, or any, suitable connections of the frame with the other wheel or wheels and parts of the bicycle or other machine may be made.

In a bicycle, suitably mounted above the driving wheel, the weight of the frame of the machine and of the rider falling upon the axle $c$, and through it, as above described, to the driving-wheel, the latter, and with it the whole machine, is propelled by the action of the rider on the pedals in the ordinary manner. In a locomotive the principle and construction involved is the same, except that in a locomotive wheel, as indicated in Fig. 4 friction instead of toothed gears will be preferable. In a locomotive the hollow hub $b$ will be solidly connected with each wheel of each pair of driving-wheels; the weight of the engine will fall on an axle, or axles $c, c$, connected by connecting-rods, and these will be driven from the cylinders in the usual, or any approved manner. The particular form of gearing or frictional surfaces to be employed, and the particular form or size of the rings $d$ and $h$, and of the plate or spokes $g$ is immaterial.

In the practical use of my invention the best results and the highest efficiency are attained by the use of gear or friction wheels of such size or diameter that the outer wheel possesses a radius approximately equal to the length of the pedal which is employed.

The advantages which I claim for my invention are these, first, by its aid, the center of gravity in a bicycle, locomotive, or other traction engine or machine, may be materially lowered. Second, by the use of internal gearing or frictional wheels, as described, the velocity of the driving wheels may be materially increased without any appreciable increase of frictional resistance to the operation of the bicycle, locomotive or other engine, with less pedal or leg motion, or less crank and piston speed, as the case may be, and therefore with less wear and tear and greater economy of power to the rider or to the locomotive engine and whole machine.

A consideration of the foregoing will show that while I employ elements of construction in my machine which are not new, namely, a hollow hub with an inner axle and external and internal geared or friction wheels, I use these elements in a manner wholly new. The principle underlying the mechanism I have described is the holding of the geared wheels together by imposing the weight to be carried by the driving wheel directly on the axle $c$, and only indirectly on the opposite ends of a single hub by the resting of the outer internally geared or frictional wheels $d, d$ upon the upper surface of the rings $h, h$ around the hub. By this means the advantages of the gearing are obtained without the loss by friction which results from holding the geared wheels together by a frame and journals, and increase of speed becomes possible with a minimum of friction, otherwise impossible. Moreover the free play which is allowed to the driving-wheel by its not being held in a frame or journals and having but two points of contact with any part of the machine, namely, the points of contact of the gearing or frictional surfaces on the top of the hollow hub, results in the machine having an elasticity of action in going over rough ground or small obstructions, which no machine with a rigid wheel can have. At the same time the center of gravity of the machine is lowered and the advantages of the ordinary safety bicycle, so called, are obtained along with as high gearing as the safety wheel permits with good results.

By the construction and arrangement described the machine is materially simplified, in that the hollow hub is composed of a single integral structure and can in fact be made of a single piece of thin metal. The bearing or supporting of the weight on the axle and on the toothed or friction gears at or near the ends of the hollow hub, and the application of power from one toothed or friction gear to the other are desirable features of my invention. The function of the toothed or friction gears is two-fold: they are weight bearing or supporting as well as power-transmitting or driving.

In the practical use of my machine, the driving wheel is held sufficiently firm without other means than the weight upon the gears themselves, and thus I am enabled to materially simplify the machine.

In traveling over rough roads at high speed the gears remain in engagement, and substantially all the jars are taken up by the forward and backward oscillation of the toothed or friction gears within and without one another. This oscillation, while seemingly objectionable, is in fact advantageous, as it provides an elasticity of motion to the machine which would otherwise be absent.

I am aware that there is nothing novel in the use of internal gearing, or of internal frictional wheels, or in the application of power through them, or in the use of a hollow hub with gearing operated by an outer internally geared wheel connected with and operated from an axle within the hollow hub, and I make no claim to a patent for the use of any one of these forms of mechanism alone.

In my invention the driving-hub is free to play within a larger outer wheel and the driving-wheel and hub are maintained in place when the machine is in motion and the power being applied, by imposing the weight to be carried by the driving wheel not directly upon the hub of the driving-wheel but upon an axle playing free within the hollow hub, whereby the outer internally geared or frictional wheels are the means by which the weight, as well as the power, is transferred from the inner axle to the upper portions of the opposite ends of the hub.

Having thus described my invention, what I claim is—

1. The combination of a single hollow hub, a driving axle bearing the weight to be carried by the driving-wheel, playing freely within said hollow hub below its center and having attached wheels overlapping and resting upon the upper sides of the two opposite ends of the said single hub, substantially as described.

2. The combination of a single hollow hub formed as an integral structure from end to end and having each of its two opposite ends provided with a gear, a driving-axle bearing the weight to be carried by the driving-wheel, playing freely within said hollow hub below its center and having attached wheels overlapping and engaging the upper sides of the gears on the two opposite ends of the said hollow hub, substantially as described.

3. The combination in a bicycle or other vehicle, of a single hollow hub, a driving-axle arranged within the hub and freely movable to and fro during the travel of the vehicle and having attached wheels which engage the upper side portions of the two opposite ends of the single hub, substantially as described.

4. In the driving wheel of a bicycle, or other machine, the combination of a single hollow hub $b$ having its two opposite end portions provided with toothed rims $h$ engaged by the toothed surfaces of outer overlapping rings $d$ connected with an inner axle $c$ extending through said hollow hub $b$ and directly below its central line, with said outer geared wheels $d$ resting upon and engaging the toothed rims $h$, and said axle $c$ freely movable to and fro in the hub and bearing, by any suitable means, the weight to be carried by the driving-wheel, substantially as described.

In testimony whereof I have hereunto set my hand and affixed my seal in presence of two subscribing witnesses.

CHARLES ACTON IVES. [L. S.]

Witnesses:
WILLIAM G. WARD, Jr.,
JERE K. SULLIVAN.